April 30, 1935.  H. J. GALEY  1,999,562
PROCESS AND APPARATUS FOR MAKING FLAT GLASS
Filed March 21, 1934  3 Sheets-Sheet 1
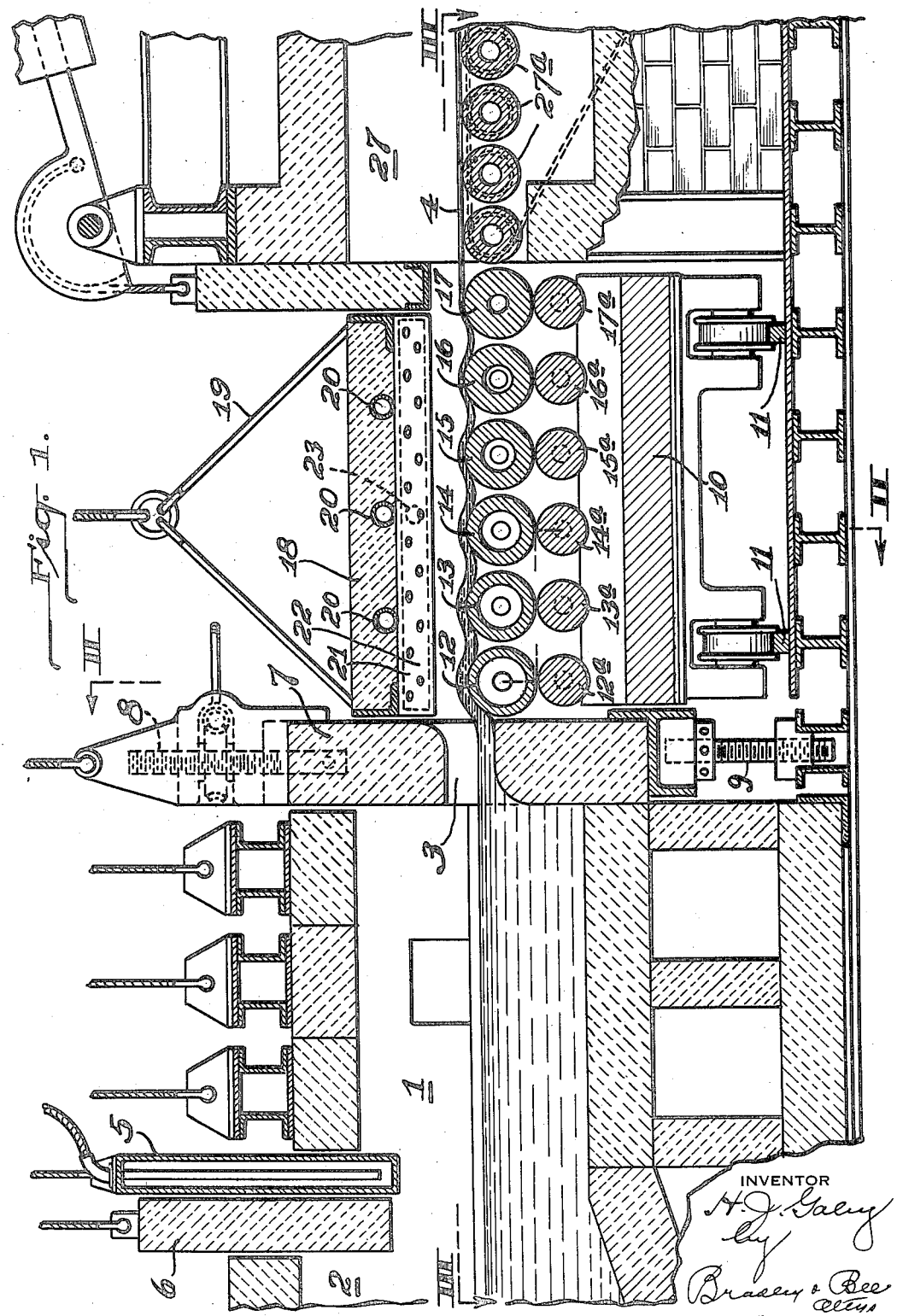

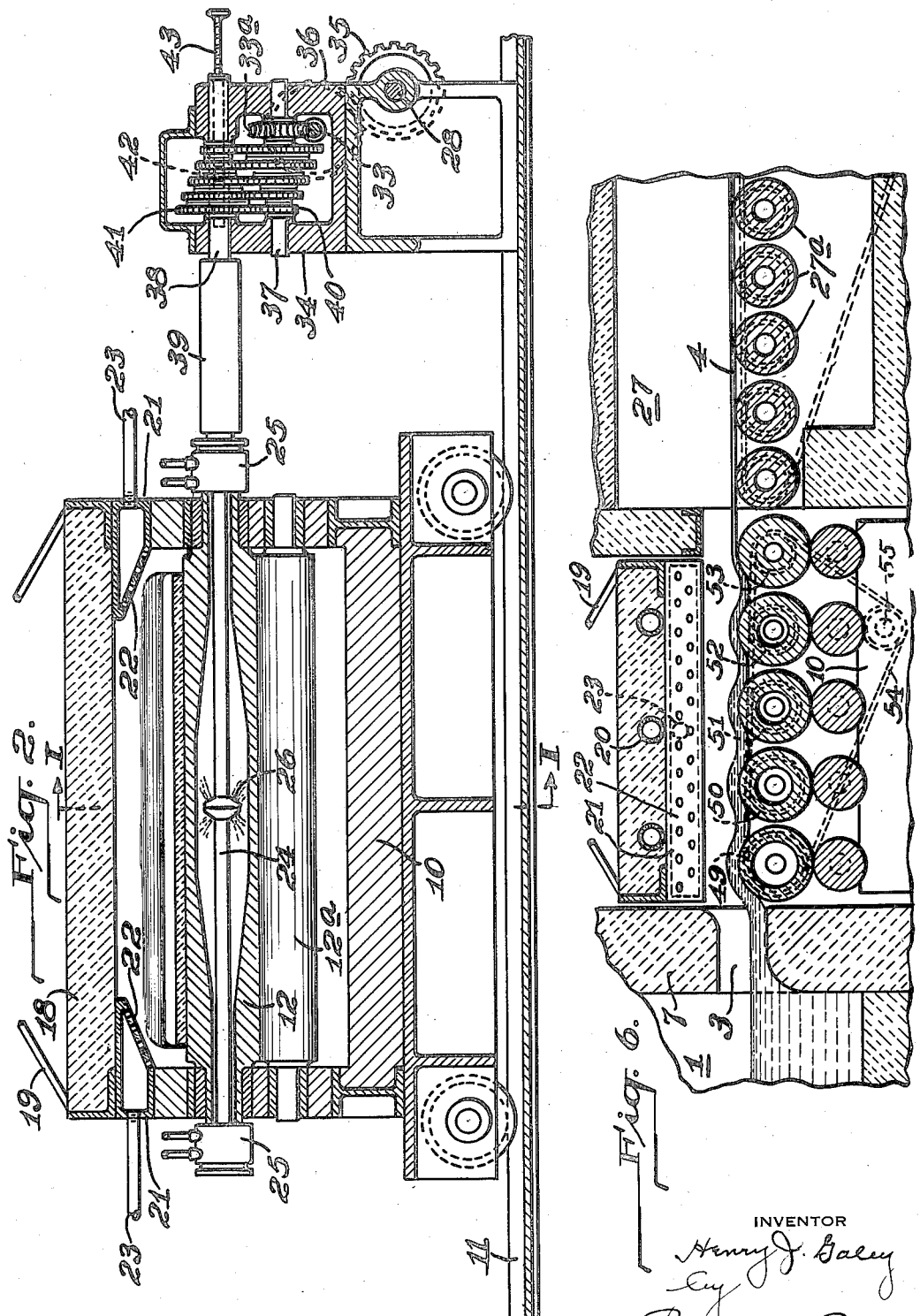

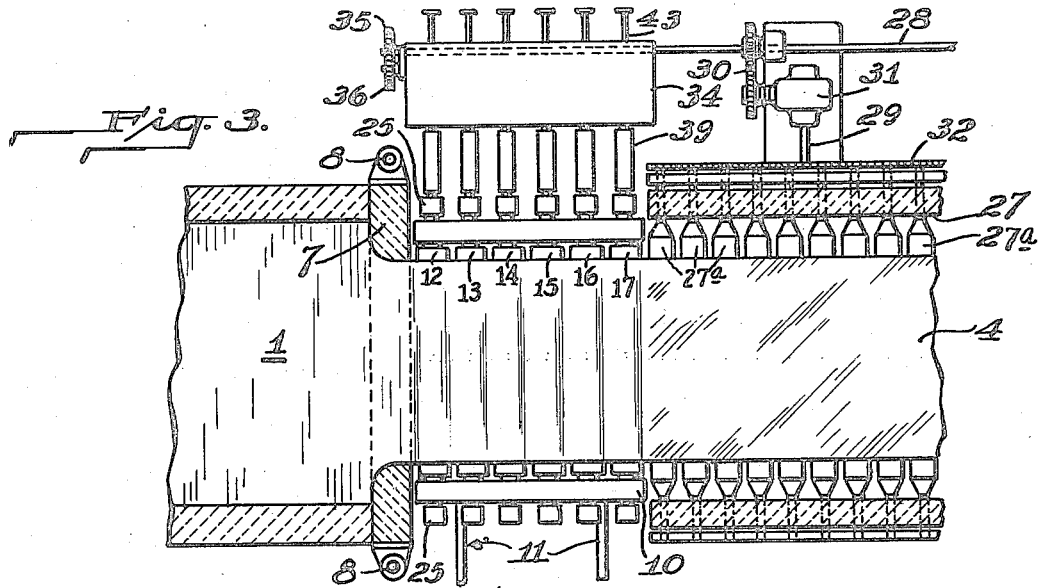
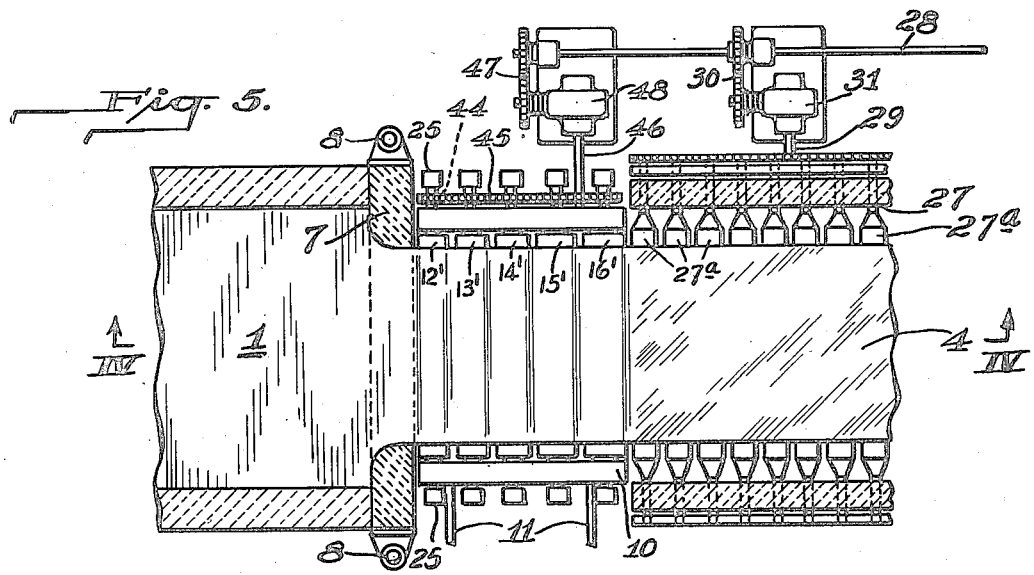
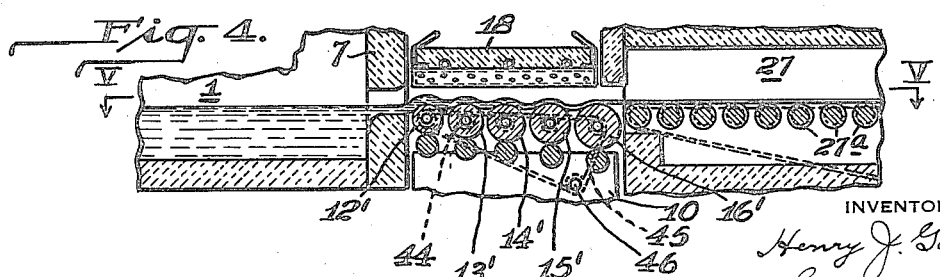

Patented Apr. 30, 1935

1,999,562

UNITED STATES PATENT OFFICE 1,999,562

PROCESS AND APPARATUS FOR MAKING FLAT GLASS

Henry J. Galey, Tarentum, Pa., assignor to Pittsburgh Plate Glass Company, a corporation of Pennsylvania Application March 21, 1934, Serial No. 716,619

7 Claims. (Cl. 49—3)

The invention relates to a process and apparatus for making flat glass with one rough and one fire finished surface, so that the grinding and polishing of only one side is necessary in order to produce a species of plate glass. Such glass may be used to advantage in the production of laminated glass since it is cheaper than plate glass, and when the lamination is made with the fire finished surfaces of the glass sheets next to the reinforcing sheet, the product closely approximates in appearance laminated glass which is made from regular plate glass. The primary objects are the provision of an improved process and apparatus for producing glass by a continuous process which has its upper surface fire finished and unmarred by contact with any forming body. A further object is the provision of a process and apparatus which does not require guns, or edge guides, so that the edges on the continuous sheet are smoother and more perfect than is the case with a sheet produced by apparatus of the ordinary commercial type employing sizing rolls and requiring guns at the ends of such rolls. Certain embodiments of the invention are illustrated in the accompanying drawings, wherein:

Figure 1 is a longitudinal section through the apparatus on the line I—I of Fig. 2. Fig. 2 is a transverse section through the apparatus on the line II—II of Fig. 1. Fig. 3 is a horizontal section on a reduced scale on the line III—III of Fig. 1. Fig. 4 is a vertical section through a modification taken on the line IV—IV of Fig. 5. Fig. 5 is a horizontal section on the line V—V of Fig. 4. And Fig. 6 is a vertical section similar to that of Fig. 4 through a modification.

Referring to the construction of Figs. 1, 2 and 3, 1 is a tank extension connected to the melting tank 2 and provided with an outlet slot 3 through which the glass is withdrawn to form the sheet 4. The extension 1 is provided with a water cooled cut-off gate 5 and also a shear cake 6, both of which are supported from above in the usual manner, the gate 5 being lowered into the glass when it is desired to cut off the supply of glass from the melting tank to the extension. The slot 3 is provided in the end wall 7 of the extension, and such end wall is mounted for vertical adjustment by means of an overhead support, including the screw 8, and a bottom support, including the jack screw 9, these features of construction being well known in the art.

Located in the front of the extension or pot 1 is a truck 10 mounted on the rails 11, 11 and carrying the rolls 12 to 17, which constitute the runway over which the glass sheet 4 passes. Above the runway is a cover 18 of refractory material supported from above by means of the chains 19 and carrying the gas heating pipes 20, such gas heating pipes being perforated along their lower sides so that the gases from the pipes are burned in the space between the cover and the glass sheet. In some cases, these heating pipes may not be required, but ordinarily they will be necessary in order to keep the glass relatively soft and flexible so that it may be reduced in thickness as it passes over the rolls of the runway. The cover 18 also carries edge heaters 21, 21 in the form of boxes, as indicated in Fig. 2, having the perforated walls 22, 22 supplied from the gas pipes 23, 23. The purpose of these edge heaters is to insure the maintenance of the edges of the glass sheets at substantially the same temperature as the portion of the sheet lying between the edges.

As indicated in Fig. 2, provision is made for cooling a part of the rolls 12 to 17, such rolls being hollow and having extending therethrough the water supply pipes 24, to which water is supplied through the swivels 25. The pipes 24 are provided with spray means 26 at the central portions and the wall of each roll is tapered in thickness from its end to its center so that the cooling effect of the water is greater at the center of the rolls, this being desirable since the glass sheet is hotter at its central portion and hence requires more cooling at this point. The function of the cooling medium is to prevent the rolls from overheating and to insure the formation of a supporting skin on the lower surface of the glass sheet 4. These rolls are driven at gradually increasing peripheral speeds corresponding to the lengthening of the sheet due to the thinning thereof. If the glass is decreased in thickness from ½ to ¼ inch in passing over the rolls 12 to 17, the peripheral speed of the roll 17 will be twice that of the roll 12 and the speed of the intermediate rolls will be adjusted correspondingly. In advance of the rolls 12 to 17 is a runway made up of the rolls 27a, which carry the glass sheet through the leer 27. It will be seen that this arrangement provides for the formation of a sheet of the desired thickness without the use of thinning or sizing rolls so that the upper surface of the glass sheet is not marred and has a fire-finished surface. Between each pair of rolls, the glass sags, as indicated in Fig. 1, thus giving the stretching effect which is required to correspond to the gradually increasing peripheral speed of the rolls. In order to prevent any sagging of the rolls 12 to 17, a supporting roll 12a is journalled below each of such rolls and engages the periphery thereof.

The method of driving the rolls will be seen by reference to Figs. 2 and 3. The drive shaft 28 extends along the side of the leer and is driven from a motor which is not shown. This shaft drives a series of countershafts 29 through the intermediary of the gears 30 and worm gearing in the casings 31. The countershafts are provided with sprockets, around each of which passes a chain 32, such chain also passing around sprockets on the ends of the rolls 27a. The shaft 28 is extended past the gears 30 and drives a worm shaft 33 in the gear box 34 (Fig. 2) through the intermediary of the gears 35 and 36. In the lower portion of the gear box is a series of transverse countershafts 37 (one for each roll) and these countershafts are driven by the worm wheels 33a which mesh with the worm 33. In parallel above each of the countershafts 37 is a shaft 38 which is connected to the end of the roll by means of the tumbler shaft 39. The two shafts 37 and 38 are provided with the two series of intermeshing spur gears 40 and 41. A shifting key 42 is mounted in a keyway in the side of the shaft 38 and this key is movable endwise by means of the key shifting rod 43. By this means, any one of the spur gears 41 may be made to turn with the shaft 38, while the other gears 41 idle on the shaft. Provision is thus made for varying the speed of each of the gears 12 to 17 through a suitable range. Obviously, any other suitable speed changing device for controlling the speed of each of the rolls 12 to 17 might be employed, the construction shown and described being a conventional one for accomplishing this result.

The construction of the modification shown in Figs. 4 and 5 differs from that of the construction of Figs. 1 to 3 only in that the means for giving the rolls 12' to 16' increasing peripheral speed is altered. In this construction, the rolls are provided with a series of sprockets 44, and these sprockets are driven by means of a chain 45 which passes around a sprocket on the countershaft 46. This countershaft 46 is driven from the main drive shaft 28 through the intermediary of the gears 47 and the worm gearing in the casing 48. Since the rolls 12' to 16' are of increasing diameter throughout the length of the runway, the peripheral speed is correspondingly increased so that the same result is accomplished as in the construction of Figs. 1 to 3.

In the construction of Fig. 6, a different means for securing gradually increasing peripheral speed of the runway rolls is provided. In this case, the rolls are provided at their ends with sprockets 49 to 53 of gradually decreasing diameter from one end of the runway to the other, and these sprockets are driven from the chain 54. The chain 54 passes around a sprocket on the countershaft 55 which is driven in the same manner as the countershaft 46 in the construction of Figs. 4 and 5. In this manner, the speed of the rolls is gradually increased to take care of the stretch in the sheet.

What I claim is:

1. A method of producing flat glass having a natural fire finish on one surface, which consists in withdrawing a sheet continuously laterally from a body of molten glass, carrying the sheet at increasing speed maintained at a temperature at which the glass will fire polish on its upper surface over a series of spaced supporting rolls between the members of which the sheet is permitted to sag, thus reducing the thickness of the sheet to a final predetermined dimension, and during such operation maintaining the upper surface of the sheet free from contact with any solid body.

2. Apparatus for producing flat glass having a natural fire finish on one surface, comprising a melting tank having at one side an outlet opening, a series of rolls leading from said opening constituting a runway, means for driving the rolls progressively at gradually increasing peripheral speeds to withdraw the glass from the slot in a sheet of gradually decreasing thickness which sags and stretches between the successive rolls, and a second runway in advance of the first runway for carrying the sheet forward after it has been reduced to a predetermined thickness on said first runway, the space above said first runway being free from forming or sizing means tending to mar the upper surface of the sheet.

3. Apparatus for producing flat glass having a natural fire finish on one surface, comprising a melting tank having at one side an outlet opening with its upper side spaced above the surface of the glass, a series of rolls leading from the opening constituting a runway, the roll next to the tank having its periphery located above the level of the glass in the tank, means for driving the rolls progressively at gradually increasing peripheral speeds to withdraw the glass from the slot in a sheet of gradually decreasing thickness which sags and stretches between the successive rolls, and a second runway in advance of the first runway for carrying the sheet forward after it has been reduced to a predetermined thickness on said first runway, the space above said first runway being free from forming or sizing means tending to mar the upper surface of the sheet.

4. Apparatus for producing flat glass having a natural fire finish on one surface, comprising a melting tank having at one side an outlet opening, a series of rolls leading from said opening constituting a runway, means for driving the rolls progressively at gradually increasing peripheral speeds to withdraw the glass from the slot in a sheet of gradually decreasing thickness which sags and stretches between the successive rolls, a cover above the runway, means for heating the sheet as it moves along the runway, and a second runway in advance of the first runway for carrying the sheet forward after it has been reduced to a predetermined thickness on said first runway, the space above said first runway being free from forming or sizing means tending to mar the upper surface of the sheet.

5. Apparatus for producing flat glass having a natural fire finish on one surface, comprising a melting tank having at one side an outlet opening, a series of rolls leading from said opening constituting a runway, means for driving the rolls progressively at gradually increasing peripheral speeds to withdraw the glass from the slot in a sheet of gradually decreasing thickness which sags and stretches between the successive rolls, a cover above the runway, means for heating the edges of the sheet as it moves along the runway, and a second runway in advance of the first runway for carrying the sheet forward after it has been reduced to a predetermined thickness on said first runway, the space above said first runway being free from forming or sizing means tending to mar the upper surface of the sheet.

6. Apparatus for producing flat glass having a natural fire finish on one surface, comprising a melting tank having at one side an outlet opening, a series of rolls leading from said opening constituting a runway, means for driving the rolls progressively at gradually increasing peripheral speeds to withdraw the glass from the slot in a sheet of gradually decreasing thickness which sags and stretches between the successive rolls, a supporting roll beneath each of said rolls in parallel therewith and engaging the periphery thereof, and a second runway in advance of the first runway for carrying the sheet forward after it has been reduced to a predetermined thickness on said first runway, the space above said first runway being free from forming or sizing means tending to mar the upper surface of the sheet.

7. Apparatus for producing flat glass having a natural fire finish on one surface, comprising a melting tank having at one side an outlet opening, a series of rolls leading from said opening constituting a runway, an independent change speed drive for each of the rolls regulated so as to drive the rolls at gradually increasing peripheral speeds to withdraw the glass from the slot in a sheet of gradually decreasing thickness which sags and stretches between the successive rolls, and a second runway in advance of the first runway for carrying the sheet forward after it has been reduced to a predetermined thickness on said first runway, the space above said first runway being free from forming or sizing means tending to mar the upper surface of the sheet.

HENRY J. GALEY.